(12) United States Patent
Oliver et al.

(10) Patent No.: US 10,996,152 B2
(45) Date of Patent: May 4, 2021

(54) APPARATUS AND METHOD FOR TWO DIMENSIONAL NANOINDENTATION

(71) Applicant: KLA-Tencor Corporation, Milipitas, CA (US)

(72) Inventors: Warren C. Oliver, Knoxville, TN (US); Kermit H. Parks, Knoxville, TN (US); Kurt Johanns, Powell, TN (US); P. Sudharshan Phani, Telangana (IN); John B. Pethica, Oxford (GB)

(73) Assignee: KLA-Tencor Corporation, Milipitas, CA (US)

( * ) Notice: Subject to any disclaimer, the term of this patent is extended or adjusted under 35 U.S.C. 154(b) by 159 days.

(21) Appl. No.: 16/247,012

(22) Filed: Jan. 14, 2019

(65) Prior Publication Data
US 2019/0226960 A1 Jul. 25, 2019

Related U.S. Application Data

(60) Provisional application No. 62/619,486, filed on Jan. 19, 2018.

(51) Int. Cl.
| | | |
|---|---|---|
| *G01N 3/42* | (2006.01) | |
| *B82Y 15/00* | (2011.01) | |
| *G01Q 60/36* | (2010.01) | |

(52) U.S. Cl.
CPC ............... *G01N 3/42* (2013.01); *B82Y 15/00* (2013.01); *G01Q 60/366* (2013.01); *G01N 2203/0286* (2013.01)

(58) Field of Classification Search
CPC . A61M 25/0147; A61B 17/0057; G01N 3/42; G01N 2203/0286; B82Y 15/00; G01Q 60/366

(Continued)

(56) References Cited

U.S. PATENT DOCUMENTS

| 4,848,141 A | 7/1989 | Oliver et al. |
| 5,797,191 A * | 8/1998 | Ziegert ............... G01B 5/008 33/503 |

(Continued)

FOREIGN PATENT DOCUMENTS

WO 2014202551 A1 12/2014

OTHER PUBLICATIONS

International Search Report and Written Opinion for PCT/US2019/014098, dated May 9, 2019, 11 pages.

*Primary Examiner* — Octavia Hollington
(74) *Attorney, Agent, or Firm* — Luedeka Neely Group, P.C.

(57) ABSTRACT

A two-dimensional nanoindentation measurement apparatus includes a first actuator that imparts a first force in a first direction, and a second actuator that imparts a second force in a second direction orthogonal to the first direction. A first elongate member has a first end attached to the first actuator and a second end attached to an indenter tip that engages the surface of the sample. A second elongate member includes a first end attached to the second actuator and a second end connected to the second end of the first elongate member. The first elongate member is rigid in the first direction and compliant in the second direction, and the second elongate member is rigid in the second direction and compliant in the first direction. The first force is imparted to the indenter tip in the first direction through the first elongate member, and the second force is imparted to the indenter tip in the second direction through the second elongate member.

21 Claims, 10 Drawing Sheets

(58) Field of Classification Search
USPC .............................................................. 73/85
See application file for complete search history.

(56) References Cited

U.S. PATENT DOCUMENTS

| | | | |
|---|---|---|---|
| 6,640,459 B1 | 11/2003 | Lucas et al. | |
| 7,685,868 B2 * | 3/2010 | Woirgard | G01N 3/42 |
| | | | 73/81 |
| 8,196,458 B2 | 6/2012 | Bonilla et al. | |
| 10,132,830 B2 * | 11/2018 | Bellaton | G01Q 20/00 |
| 2009/0260427 A1 | 10/2009 | Woirgard et al. | |
| 2017/0138982 A1 | 5/2017 | Bellaton et al. | |

* cited by examiner

Mode 1: 140 Hz
— Deformed
— Undeformed

FIG. 8C

Mode 2: 211 Hz
— Deformed
— Undeformed

*FIG. 13*

APPARATUS AND METHOD FOR TWO DIMENSIONAL NANOINDENTATION

RELATED APPLICATIONS

This application claims priority to U.S. provisional patent application No. 62/619,486, filed Jan. 19, 2018, titled "Apparatus and Method for Two Dimensional Nanoindentation," the entire contents of which are incorporated herein by reference.

FIELD

This invention relates to the field of nanoindentation measurements. More particularly, this invention relates to a system for measuring mechanical properties of materials by application of normal and lateral forces to a material sample.

BACKGROUND

Contact measurements between a nanoindentation probe and a thin film material can provide significant information regarding properties of the surface of the material, such as stiffness, yield strength, creep resistance, stress relaxation, modulus, fracture toughness, and fatigue.

Some known nanoindentation measurement systems, such as described in U.S. Pat. No. 4,848,141, provide for continuous measurement of the elastic response of a mechanical junction between an indentation probe and a sample material. Such systems apply an increasing direct force to the probe to load the junction while simultaneously applying a relatively small amplitude oscillatory force to alternately load and unload the junction. Continuous measurement of the amplitude and phase of the resulting displacement of the probe as the oscillatory forces are applied provides a continuous indication of the stiffness of the junction.

Some measurement systems, such as described in U.S. Pat. No. 6,640,459, provide for multidimensional surface mechanics measurements. Such systems include multiple elongate members that are oriented orthogonally to each other and coupled together by a coupler, with an indentation probe connected to the coupler. Forces applied to the elongate members cause movement of the probe in a direction that is normal to the surface, and in one or more directions parallel to the surface.

These known systems are not easily constructed and calibrated for two-dimensional measurements. The system described in U.S. Pat. No. 6,640,459 requires three elements (one in each orthogonal direction) that must be aligned properly to allow the system to operate. Even if one of the three elements is used to simply immobilize one of the axes of motion (thus producing a two dimensional system), that third element must be present and aligned so that the other two axes can operate properly.

SUMMARY

To overcome the limitations of the prior art, embodiments described herein require only two elongate elements for making two dimensional measurements. Compared to three-element systems, the two-element systems described herein can be constructed with higher performance and lower cost, and their static and dynamic properties are much easier to quantify, which leads to more accurate modelling. The geometry of the two elements is selected so that they are rigid in two orthogonal directions and compliant in a third orthogonal direction. In some preferred embodiments, the elements are thin elongate members that are rigid in the two directions in the plane of the member and compliant to bending in the third dimension.

Preferred embodiments described herein provide a two-dimensional nanoindentation measurement apparatus for making nanoindentation measurements on a surface of a material sample. The apparatus includes first and second actuators attached to a rigid frame, wherein the first actuator is operable to impart a first force in a first direction, and the second actuator is operable to impart a second force in a second direction that is orthogonal to the first direction. Attached to the first actuator is a first elongate member having a first length dimension disposed parallel to the first direction and a first width dimension disposed parallel to a third direction which is orthogonal to the first direction. The first elongate member includes a first end attached to the first actuator and a second end spaced apart from the first end. An indenter tip is connected to the second end of the first elongate member. The indenter tip is operable to engage the surface of the material sample. The second elongate member has a second length dimension disposed parallel to the second direction and a second width dimension disposed parallel to the third direction. The second elongate member includes a first end attached to the second actuator and a second end spaced apart from the first end and connected to the second end of the first elongate member. The first force is imparted to the indenter tip in the first direction through the first elongate member, and the second force is imparted to the indenter tip in the second direction through the second elongate member.

In some embodiments, the profile shape of the first and second elongate members is rectangular, oval, elliptical, triangular, or quadrilateral.

In some embodiments, the cross-sectional shape of the first and second elongate members is rectangular, oval, elliptical, triangular, or quadrilateral.

In some embodiments, the first and second elongate members are solid structures or truss-like structures.

In some embodiments, the first elongate member is rigid in the first and third directions, and compliant in the second direction, and the second elongate member is rigid in the second and third directions, and compliant in the first direction.

In some embodiments, the ratio of the first length dimension to the first width dimension is about 4:1, and the ratio of the second length dimension to the second width dimension is about 4:1.

In some embodiments, the first and second length dimensions are about 20 mm and the first and second widths dimension are about 5 mm.

In some embodiments, each of the first and second elongate members has a thickness of about 0.2 mm.

In some embodiments, the ratio of length to thickness of the first and second elongate members is at least about 100:1.

In some embodiments, the first and second elongate members are formed from silica, Silicon, or Invar.

In another aspect, a method is described herein for determining a contact area of an indenter tip in a surface of a material sample using the two-dimensional nanoindentation measurement apparatus. In a preferred embodiment, the method includes:

(a) moving the indenter tip toward the surface of the material sample in the first direction that is normal to the surface of the material sample to cause the indenter tip to contact the surface of the material sample over the contact area, wherein movement of the indenter tip is achieved by transferring a normal force from the first actuator through the first elongate member;

(b) while the indenter tip is in contact with the surface of the material sample, oscillating the indenter tip in the second direction that is parallel with the surface of the material sample and perpendicular to the first direction, wherein oscillation of the indenter tip is achieved by transferring a lateral oscillating force from the second actuator through the second elongate member;

(c) measuring a lateral stiffness of the material sample while performing step (b); and (d) calculating the contact area of the indenter tip with the surface of the material sample based on $$S_L = 8 G_{eff} a = \frac{8}{\sqrt{\pi}} G_{eff} \sqrt{A}$$

where $S_L$ is the lateral stiffness of the material sample measured in step (c), $G_{eff}$ is a known shear modulus of the material sample, and A is the contact area of the indenter tip.

In another aspect, a method is described herein for measuring properties of a thin film material sample using the two-dimensional nanoindentation measurement apparatus. In a preferred embodiment, the method includes:

(a) moving the indenter tip of the two-dimensional nanoindentation measurement apparatus toward a surface of the thin film material sample in the first direction that is normal to the surface of the thin film material sample to cause the indenter tip to contact the surface of the thin film material sample, wherein movement of the indenter tip is achieved by transferring a normal force from the first actuator through the first elongate member;

(b) while the indenter tip is in contact with the surface of the thin film material sample, moving the indenter tip in the second direction that is parallel with the surface of the thin film material sample and perpendicular to the first direction, wherein movement of the indenter tip is achieved by transferring a lateral force from the second actuator through the second elongate member; and (c) measuring one or more properties of the thin film material sample while performing step (b).

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
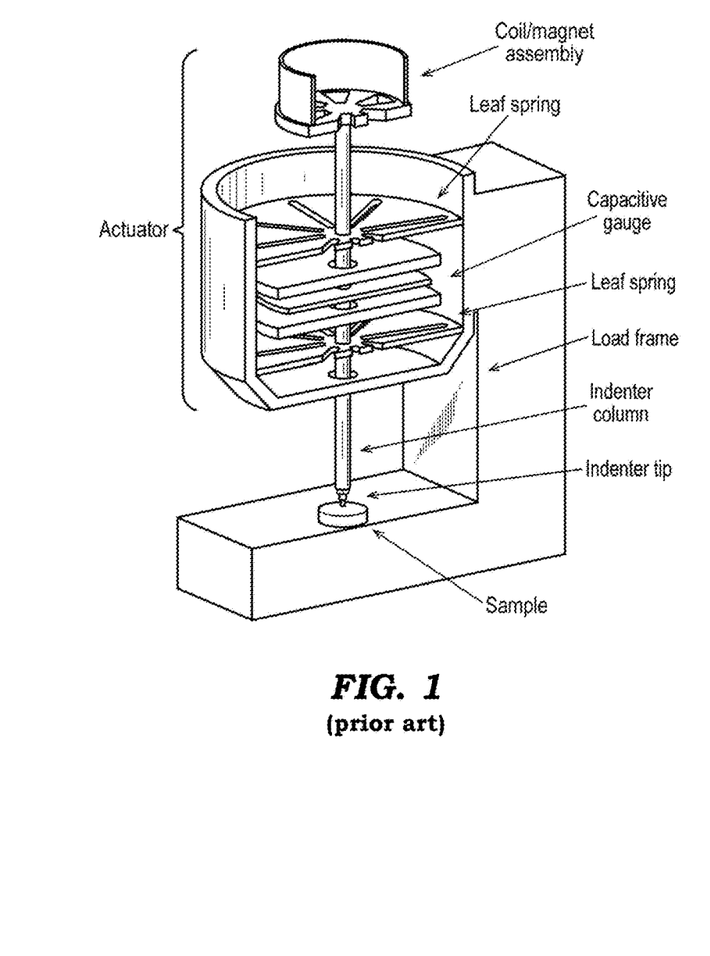
FIG. 1 depicts a prior art nanoindentation apparatus for making one-dimensional nanoindentation measurements on a material sample.
Figure 2:
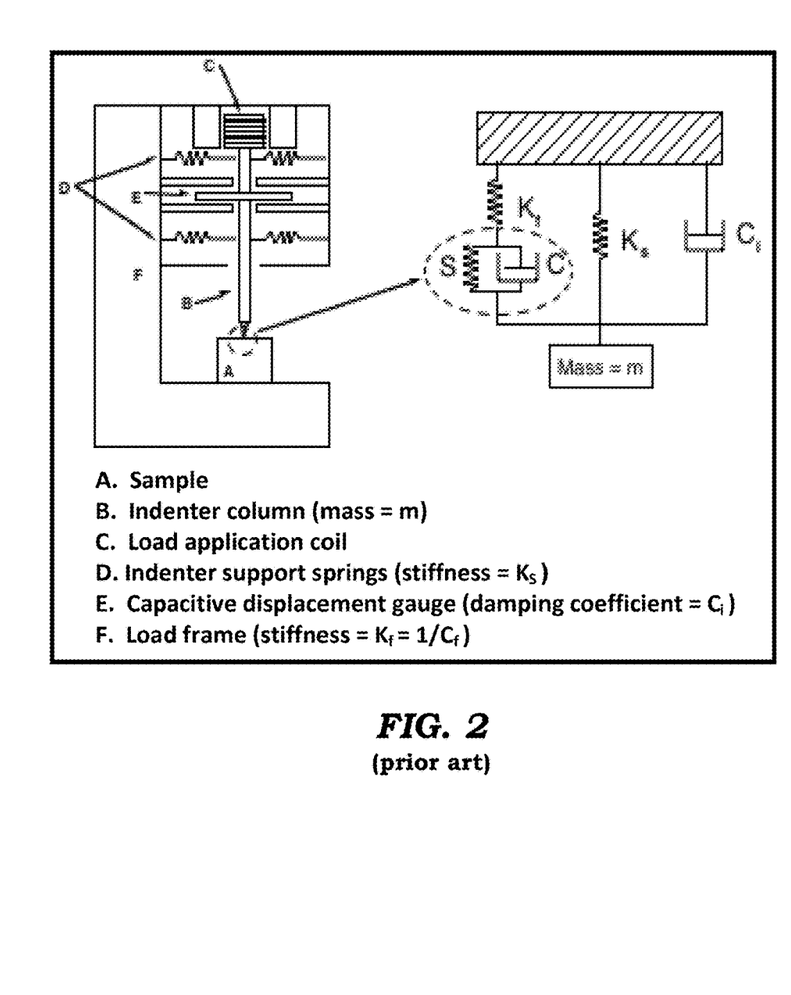
FIG. 2 depicts a schematic illustration of dynamic elements of the nanoindentation apparatus depicted in FIG. 1.

FIG. 1 depicts a standard nanoindentation apparatus for making one-dimensional nanoindentation measurements on a material sample. The apparatus includes an electromagnetic actuator that moves an indenter tip in a normal direction relative to a sample. The actuator includes a coil/magnet assembly that is driven by an electrical current from a computer-controlled variable current source. The coil/magnet assembly causes one-dimensional movement of an indenter column in a direction normal to the surface of the sample. The indenter column is supported by a pair of leaf springs that restrain its movement in any direction other than normal to the surface of the sample. Downward movement of the indenter column in the normal direction causes the indenter tip to engage the surface of the sample. The movement of the indenter column is measured by a capacitive displacement gauge. FIG. 2 depicts a schematic illustration of the dynamic elements of the nanoindentation apparatus depicted in FIG. 1.

Figure 3:
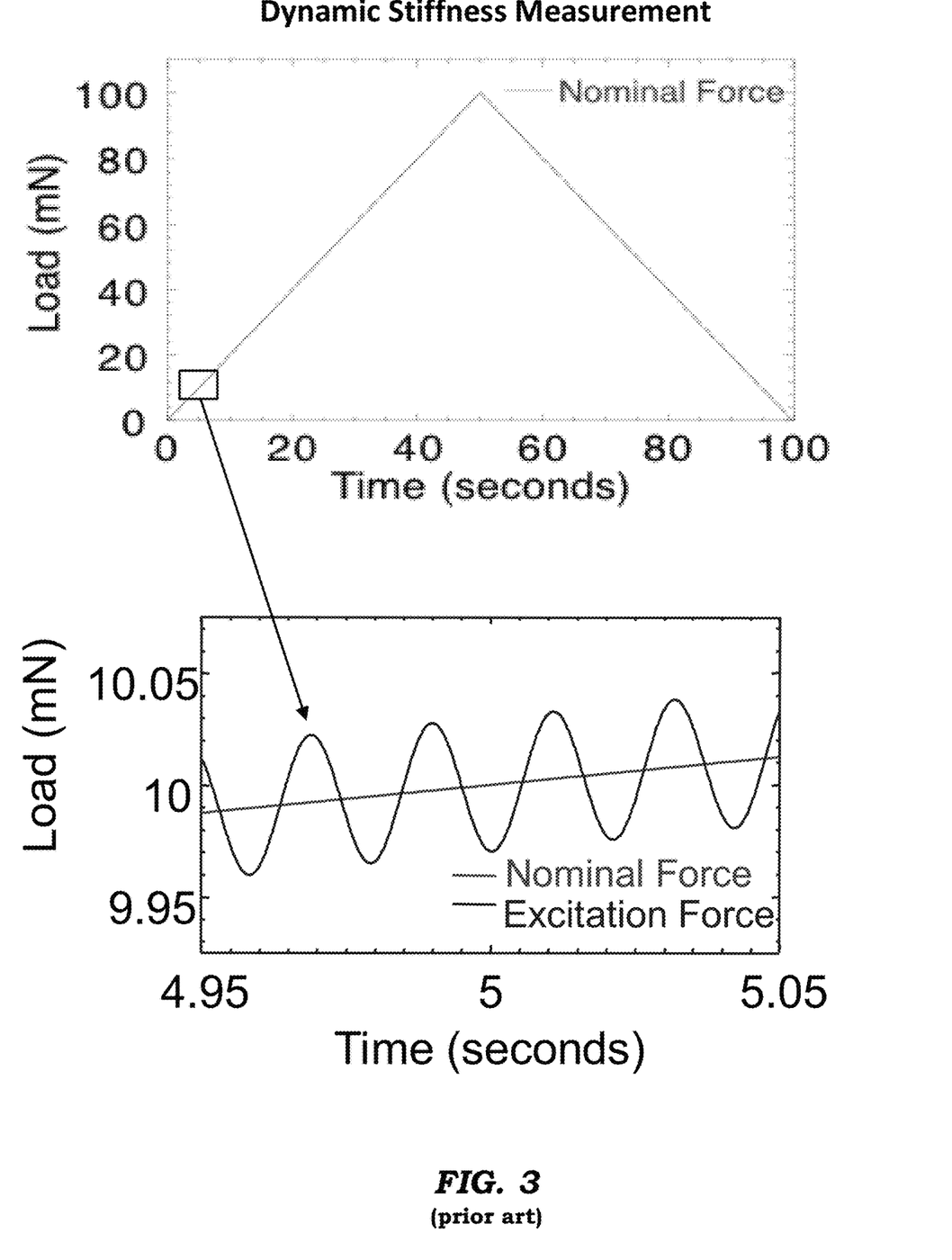
FIG. 3 depicts graphs of load force versus time during a dynamic stiffness measurement.

As depicted in the graphs of FIG. 3, a dynamic stiffness measurement of the sample may be accomplished by engaging the indenter tip with the surface of the sample, gradually increasing a nominal load force (loading), and then gradually decreasing the nominal load force (unloading). Simultaneously, a relatively small oscillating excitation force may be applied to alternately load and unload the junction where the tip engages the sample. The frequency of oscillation of the excitation force may be in the range of 0.5 Hz to 1 MHz. The calculation of stiffness using this measurement technique is described in U.S. Pat. No. 4,848,141, the entire contents of which are incorporated herein by reference.

Figure 4:
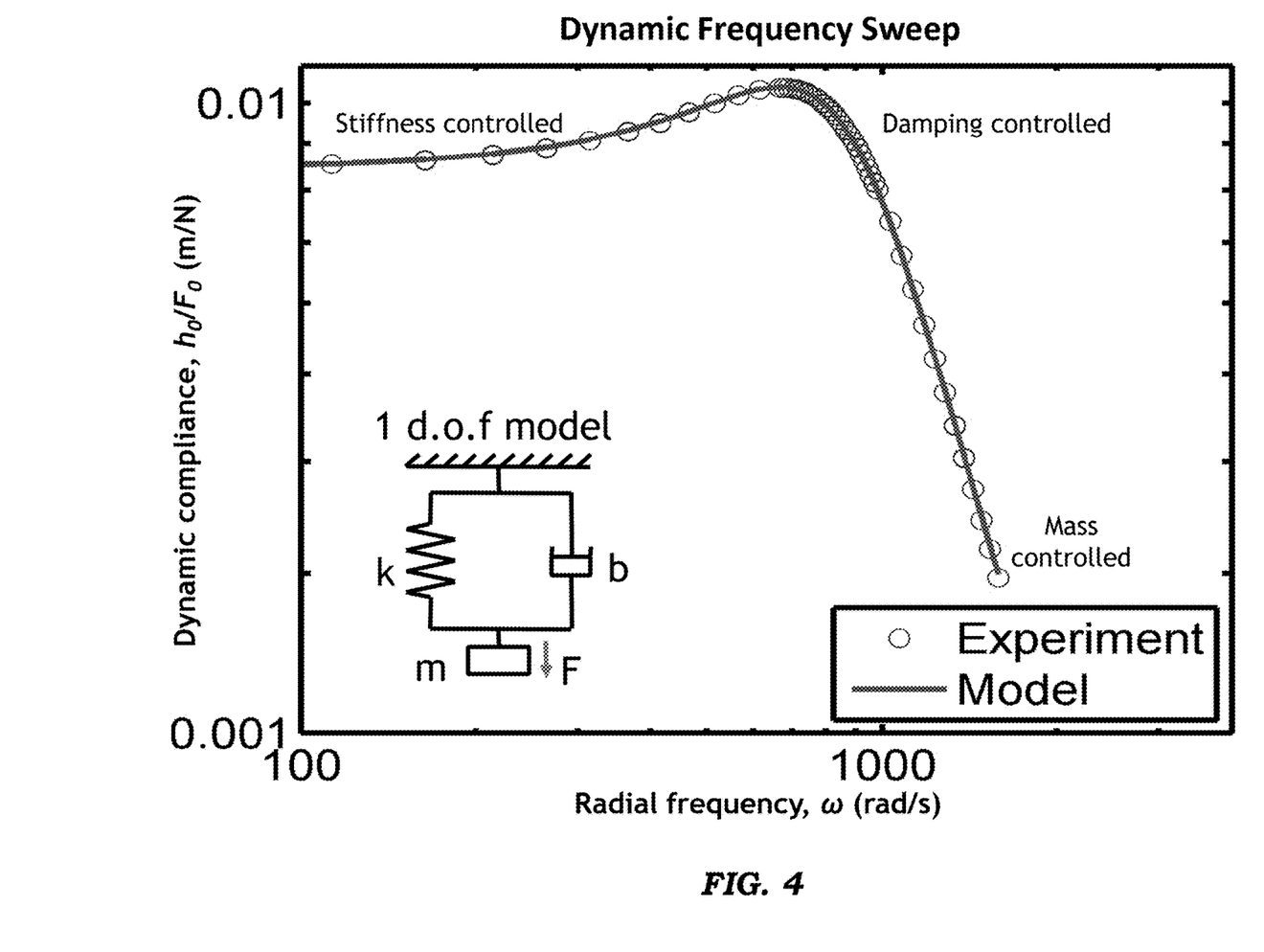
FIG. 4 depicts a relationship between dynamic compliance and the frequency of oscillation of an excitation load force for the one-dimensional measurement system depicted in FIG. 1.

FIG. 4 shows an example of the relationship between dynamic compliance ($h_0/F_0$) and the frequency of oscillation of the excitation force for the one-dimensional measurement system depicted in FIG. 1. The solid line is the damped harmonic oscillator model, and the circles represent measured dynamic compliance values.

Figure 5:
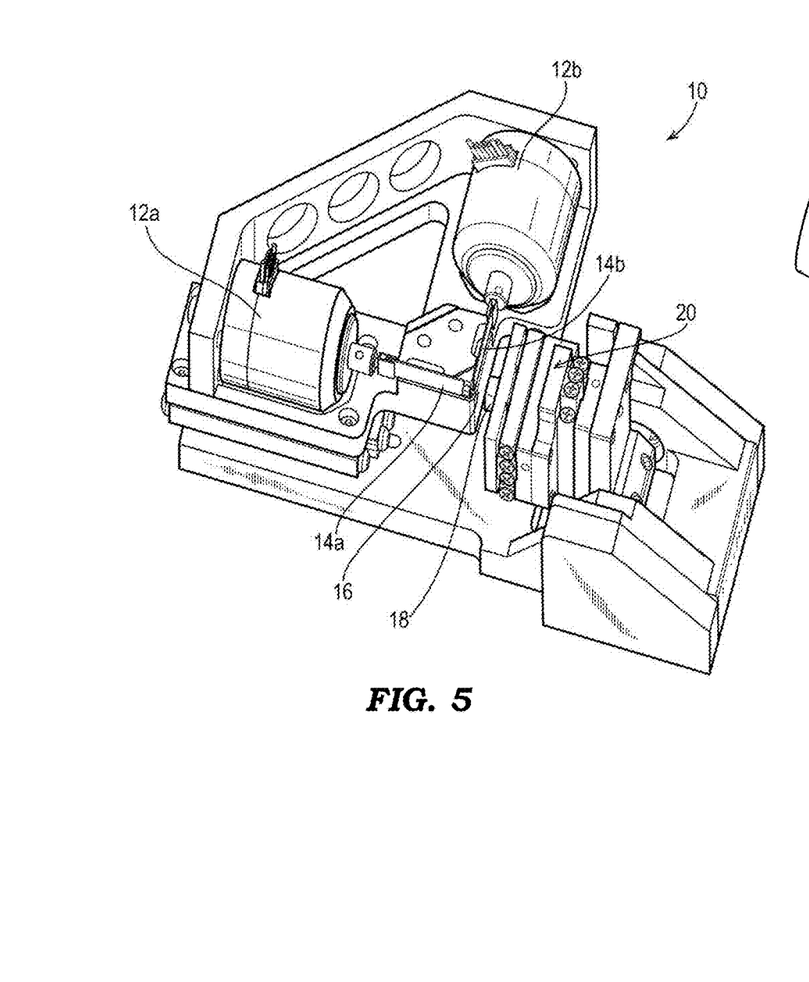
FIGS. 5 and 6 depict a nanoindentation apparatus for making two-dimensional nanoindentation measurements on a material sample.
Figures 6, 7:
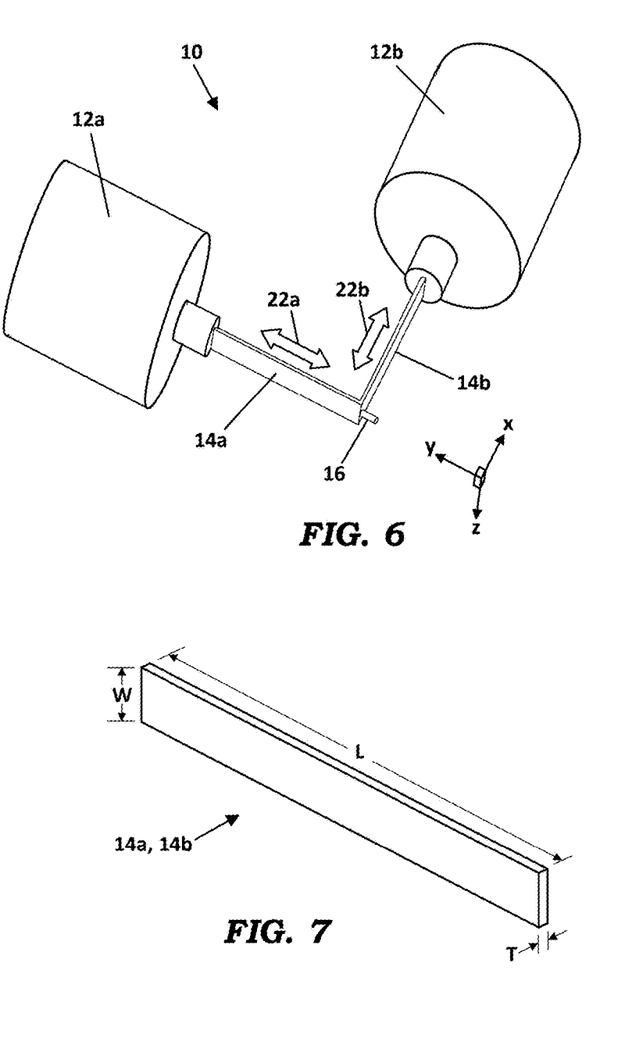
FIG. 7 depicts preferred dimensions of an elongate member of the two-dimensional nanoindentation apparatus depicted in FIGS. 5 and 6.

A preferred embodiment of a two-dimensional nanoindentation measurement apparatus 10 is depicted in FIGS. 5 and 6. The apparatus includes two orthogonally oriented actuators 12a and 12b attached to a rigid frame 11, each actuator comprising components such as depicted in FIG. 1. The actuator 12a is connected to the proximal end of an elongate member 14a. An indenter tip 16 is attached at a distal end of the elongate member 14a. The actuator 12b is connected to the proximal end of an elongate member 14b, and the distal end of the elongate member 14b is connected to the indenter tip 16.

In some embodiments, the distal end of the elongate member 14b is connected to the indenter tip 16 by direct attachment to the indenter tip 16. In other embodiments, the distal end of the elongate member 14b is connected to the indenter tip 16 indirectly through attachment to the distal end of the elongate member 14a which is attached to the indenter tip 16. Thus, it will be appreciated that embodiments of the invention are not limited to any particular structure for attachment of the distal ends of the elongate members 14a and 14b to the indenter tip 16.

In preferred embodiments, the actuator 12a applies a normal force to the indenter tip 16 through the elongate member 14a, and the actuator 12b applies a lateral force to the indenter tip 16 through the elongate member 14b. Due to application of the normal force, the indenter tip 16 contacts the surface of a sample 18 attached to a sample holding stage 20. In preferred embodiments, the sample holding stage 20 includes one or more actuators that move the sample 18 laterally with respect to the indenter tip 16.

As the terms are used herein, a "normal force" is a force applied in the y-direction, which is perpendicular to the surface of the sample 18 as indicated by the arrow 22a in FIG. 6. A "lateral force" is a force applied in the x-direction, which is parallel to the surface of the sample 18 as indicated by the arrow 22b. A lateral force may also be applied in the z-direction in some embodiments.

Although the elongate members 14a-14b in the embodiment depicted in FIGS. 5-7 are rectangular plates, the members 14a-14b may have any elongate shape, such as oval, elliptical, triangular, or quadrilateral. Also, the cross-section of the members 14a-14b may be rectangular, triangular, quadrilateral, oval, elliptical, or other shape. Further, the members 14a-14b may be solid structures or truss-like structures. Generally, the overall shape of the elongate members 14a-14b is selected such that the elongate member 14a is rigid in the y-direction and z-direction and is compliant in the x-direction, and the elongate member 14b is rigid in the x-direction and z-direction and compliant in the y-direction.

In a preferred embodiment, the elongate members 14a-14b are formed from silica, although other materials could be used in other embodiments, such as Silicon and Invar. The material used for the members preferably (1) is elastic in its response to forces with a minimum of energy loss during flexing, (2) has low mass, and (3) has minimal shape change associated with temperature changes.

With reference to FIG. 7, the preferred dimensions of one exemplary embodiment of the elongate members 14a-14b are about 20 mm in length (L), about 5 mm in width (W), and about 0.2 mm in thickness (T). In a preferred embodiment, the ratio of length to width (L/W) is about 4 to 1. The ratio of length to thickness (L/T) is preferably at least 100 to 1. These preferred ratios make the elongate member 14a rigid in the y-direction and z-direction, and compliant in the x-direction. Similarly, the elongate member 14b is rigid in the x-direction and z-direction, and compliant in the y-direction. These preferred ratios, together with minimizing all of the dimensions, results in the low mass needed for dynamic measurements. The performance of any beam for this purpose can be easily calculated using any standard test on the bending of beams.

Figure 8A:
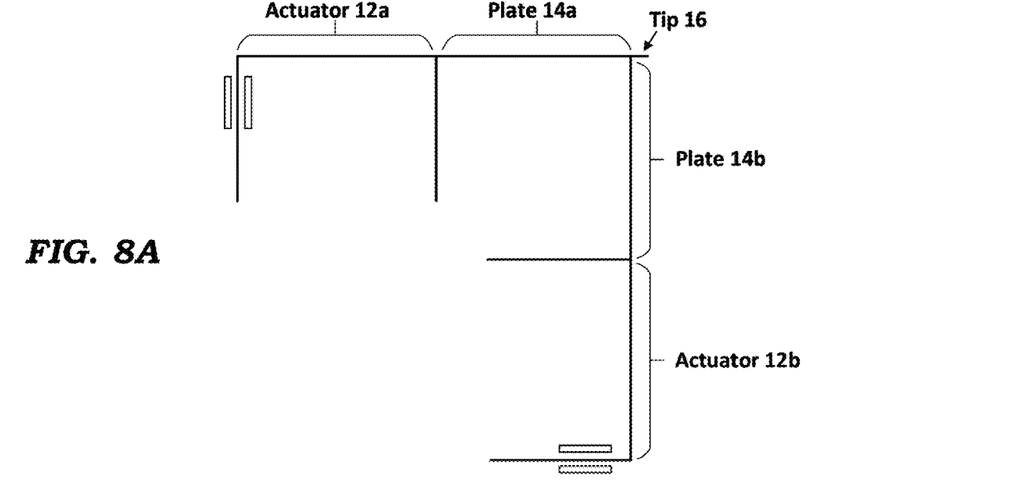
FIG. 8A depicts a simple beam model of the two-dimensional nanoindentation apparatus depicted in FIGS. 5 and 6.
Figure 8B:
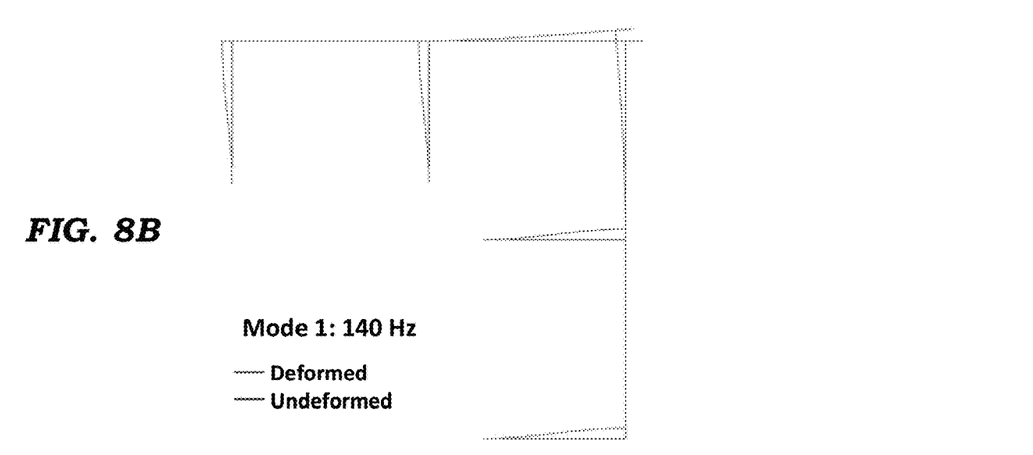
FIGS. 8B and 8C depict simple beam models of the two-dimensional nanoindentation apparatus depicted in FIGS. 5 and 6 for two different vibration modes.
Figure 8C:
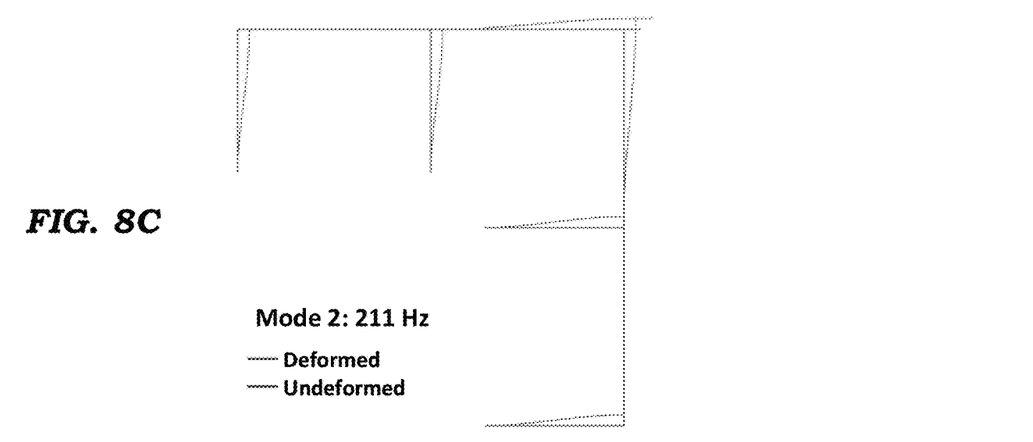
Figure 9:
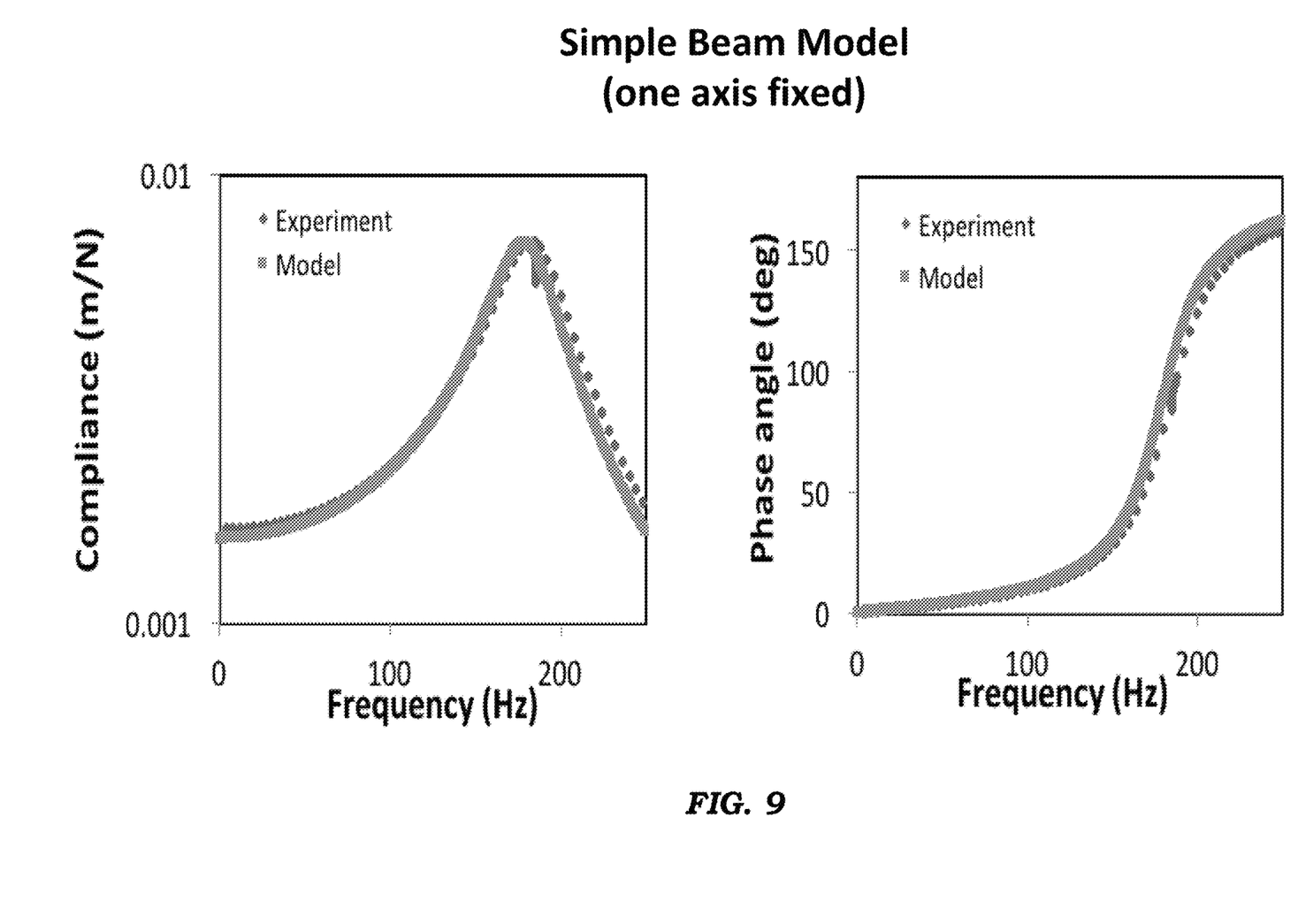
FIG. 9 compares experimental compliance data to modeled compliance data for the simple beam model of FIG. 8A with one axis fixed.
Figure 10:
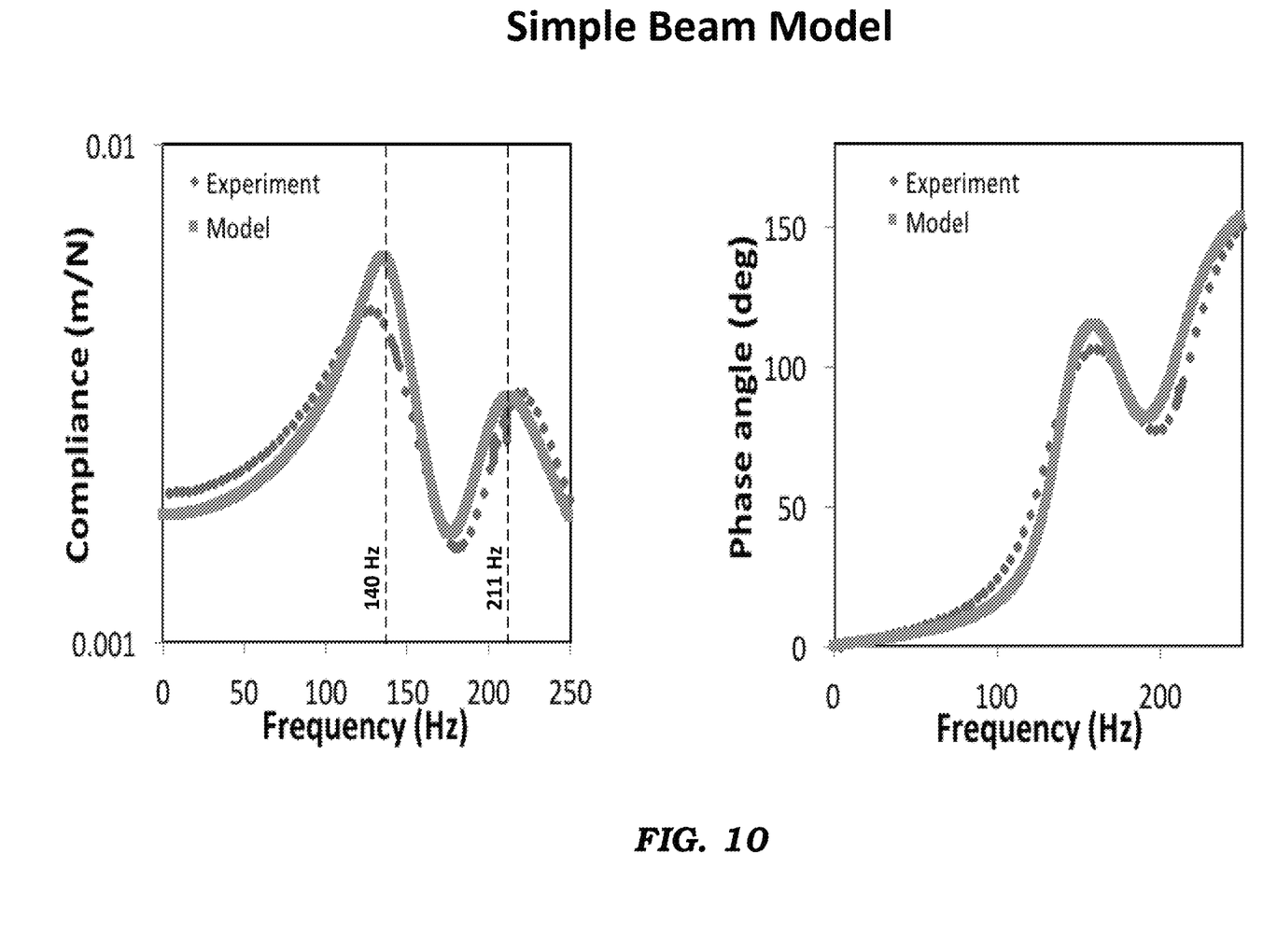
FIG. 10 compares experimental compliance data to modeled compliance data for the simple beam model of FIG. 8A with no axis fixed.

As shown in FIG. 8A, a simple beam model of the two-dimensional nanoindentation apparatus 10 may be used to visualize deflections in the various components of the apparatus as normal and lateral forces are applied by the actuators 12a-12b. FIGS. 8B and 8C depict deformations that occur in the structure of the apparatus 10, and these two deformation geometries are used to predict two resonant frequencies: 140 Hz and 211 Hz. These resonant frequencies cause the peaks in the compliance curves shown in FIG. 10. If one of the two axes is immobilized, the system reverts to a one-dimensional system as depicted in FIG. 9.

Determination of Film Properties Based on Lateral Stiffness

Figure 11A:
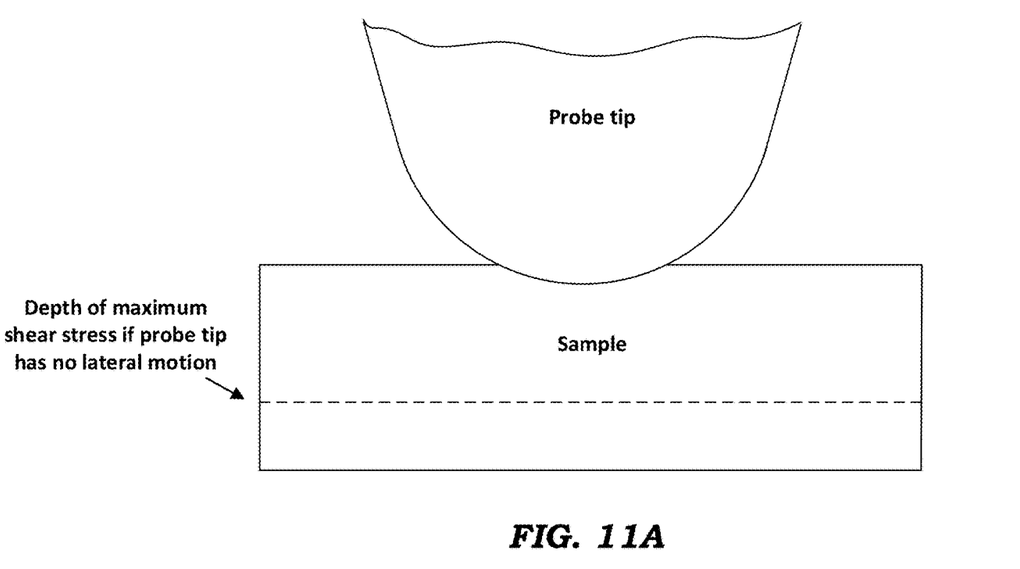
FIGS. 11A and 11B depict differences in the depth of maximum shear stress in a sample for a probe tip contacting a sample surface without lateral motion and with lateral motion.
Figure 11B:
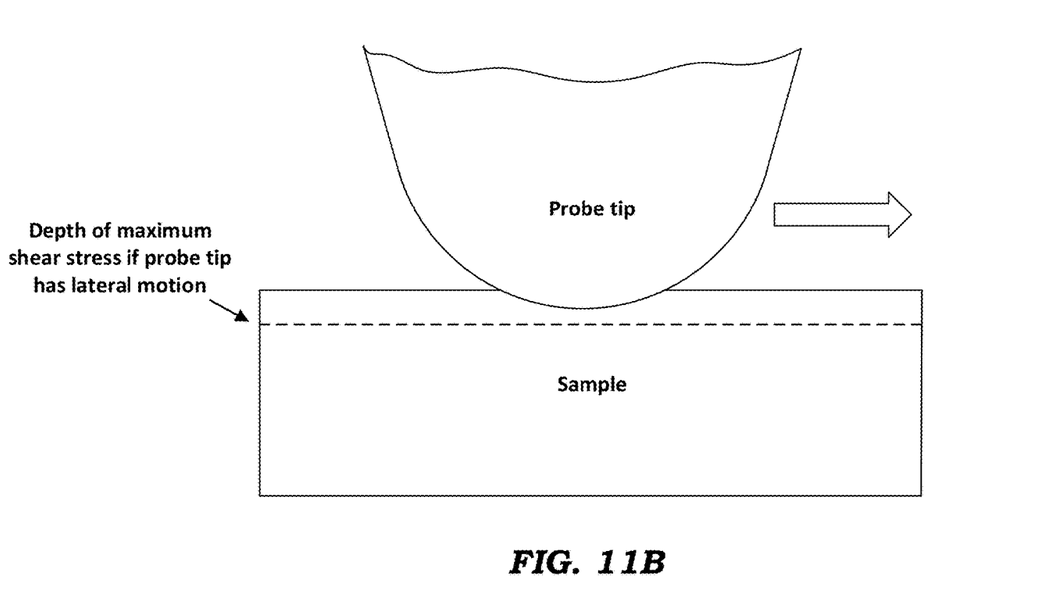

One advantage provided by the two-dimensional nanoindentation apparatus 10 depicted in FIGS. 5 and 6 is increased accuracy in measuring surface properties of thin films. As shown in FIG. 11A, when an indenter tip applies a normal force to a material sample with no lateral motion of the tip, maximum shear stress in the sample occurs at a depth well below the surface of the sample. The depth of maximum shear stress is generally proportional to the radius of the surface of the indenter tip that is in contact with the sample surface. On the other hand, as shown in FIG. 11B, when the same indenter probe tip applies the same normal force to the same material sample with lateral motion of the tip, maximum shear stress in the sample occurs much closer to the surface of the sample. If one is interested in the properties of the sample near the surface, for example the strength of a film on a substrate, because the maximum shear stress is nearer to the surface, the results would reflect the properties of the film over that of the substrate.

Calculation of Probe Contact Area Based on Lateral Stiffness

Figure 12:
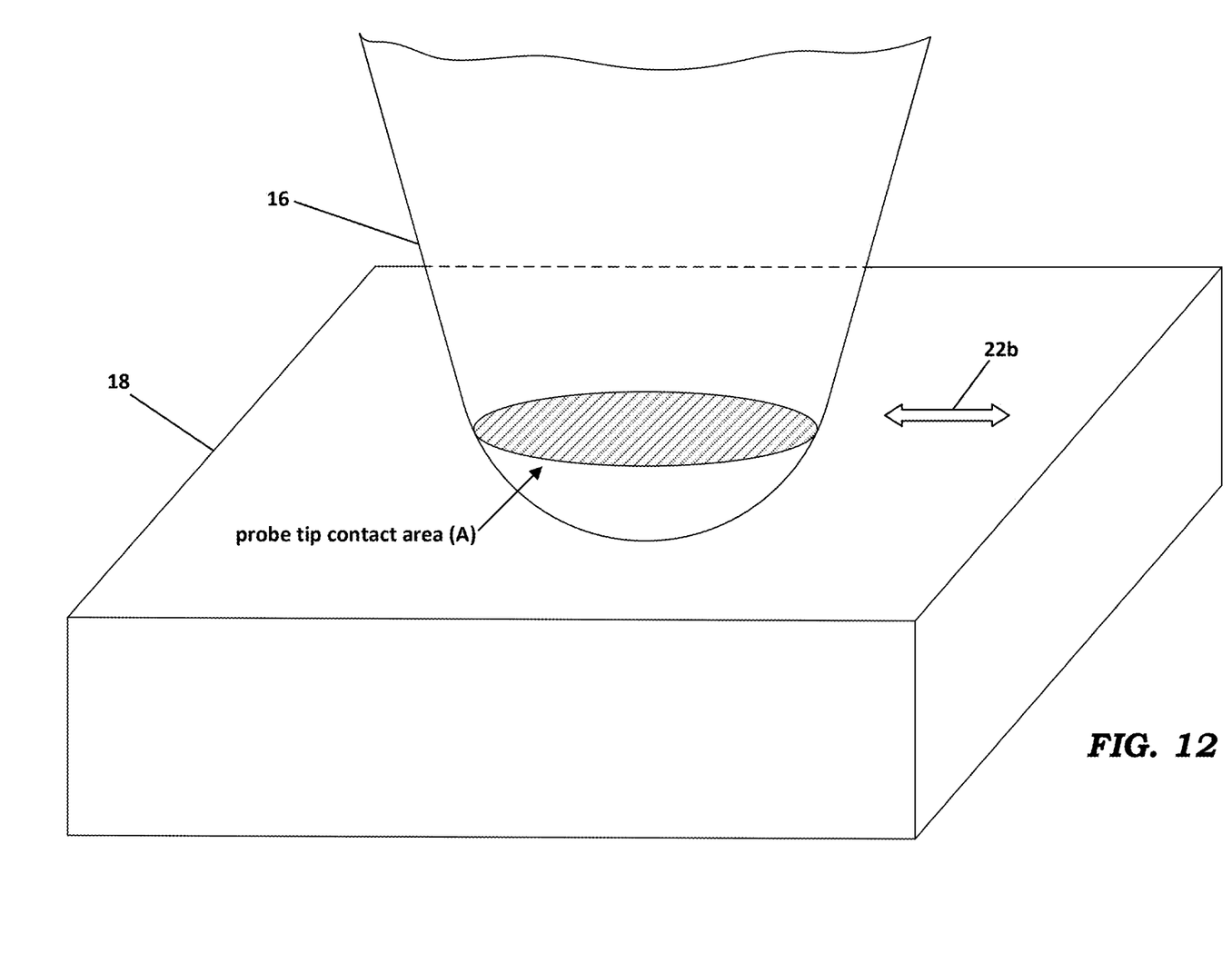
FIG. 12 depicts the contact area of an indention made in the surface of a sample by an indenter tip.
Figure 13:
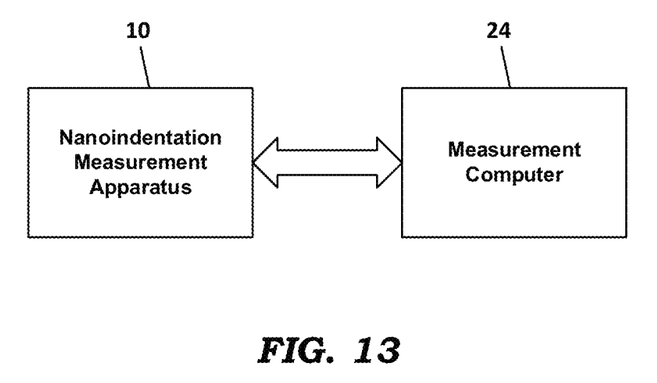
FIG. 13 depicts a measurement computer that is in communication with a two-dimensional nanoindentation measurement apparatus.

Another advantage provided by the two-dimensional nanoindentation apparatus 10 is the ability to calculate the contact area of the indention made in the surface of the sample 18 by the indenter tip 16. In a preferred method as illustrated in FIG. 12, the tip contact area (A) may be determined based on the lateral stiffness of the sample material at its surface. The lateral stiffness is measured as the indenter tip oscillates from side-to-side in the direction indicated by the arrow 22b due to an oscillating lateral force provided by the actuator 12b through the elongate member 14b. A basic equation from contact mechanics states that the normal stiffness of a contact is proportional to the effective elastic modulus of the materials from which the contact is constructed and the square root of the contact area of the contact. This equation is routinely used in the science of nanoindentation. A similar relationship exists between the lateral stiffness, the shear modulus of the material, and the square root of the contact area, which may be expressed as:

$$S_L = 8G_{eff}a = \frac{8}{\sqrt{\pi}} G_{eff} \sqrt{A}$$

where $S_L$ is the lateral stiffness of the material, $G_{eff}$ is the known shear modulus of the material, and A is the probe tip contact area. If the shear modulus of the material is known, this expression can be used to determine the contact area that exists between the probe tip and the material sample. In a preferred embodiment, the calculation of the contact area A based on the equation above is performed by software executed on a measurement computer 24 that is in communication with the measurement apparatus 10, as depicted in FIG. 13.

Other applications of the measurement apparatus depicted in FIGS. 5 and 6 include:
- measurement of phase difference between force and displacement in a direction tangential to the surface of a sample;
- measurement of energy loss due to dissipative processes in a direction tangential to the surface of a sample;
- Poisson's ratio measurement;
- static and dynamic friction coefficient measurement, such as in crystalline silica;
- nano-fretting experiments;
- highly-controlled scratch tests and friction loop experiments;
- measurement of constrained lateral deformation of thin films; and
- synchronous or asynchronous movement of a probe simultaneously in two orthogonal measurement axes to accomplish different measurement goals in the two axes simultaneously.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention.

What is claimed is:

1. A two-dimensional nanoindentation measurement apparatus for making nanoindentation measurements on a surface of a material sample, the apparatus comprising:
   a rigid frame;
   a first actuator attached to the rigid frame, the first actuator operable to impart a first force in a first direction that is normal to the surface of the material sample;
   a first elongate member having a first length dimension disposed parallel to the first direction and a first width dimension disposed parallel to a third direction which is orthogonal to the first direction, the first elongate member being more rigid in the first and third directions than it is in a second direction that is orthogonal to the first and third directions, the first elongate member including:
      a first end attached to the first actuator; and
      a second end spaced apart from the first end;
   an indenter tip connected to the second end of the first elongate member, the indenter tip operable to engage the surface of the material sample;
   a second actuator attached to the rigid frame, the second actuator operable to impart a second force in the second direction; and
   a second elongate member having a second length dimension disposed parallel to the second direction and a second width dimension disposed parallel to the third direction, the second elongate member including:
      a first end attached to the second actuator; and
      a second end spaced apart from the first end and connected to the second end of the first elongate member,
   wherein the first force is imparted to the indenter tip in the first direction through the first elongate member, and
   wherein the second force is imparted to the indenter tip in the second direction through the second elongate member.

2. The two-dimensional nanoindentation measurement apparatus of claim 1 wherein a profile shape of the first and second elongate members is rectangular, oval, elliptical, triangular, or quadrilateral.

3. The two-dimensional nanoindentation measurement apparatus of claim 1 wherein a cross-sectional shape of the first and second elongate members is rectangular, oval, elliptical, triangular, or quadrilateral.

4. The two-dimensional nanoindentation measurement apparatus of claim 1 wherein the first and second elongate members are solid structures or truss-like structures.

5. The two-dimensional nanoindentation measurement apparatus of claim 1 wherein the second elongate member is more rigid in the second and third directions than it is in the first direction.

6. The two-dimensional nanoindentation measurement apparatus of claim 1 wherein a ratio of the first length dimension to the first width dimension is about 4:1, and wherein a ratio of the second length dimension to the second width dimension is about 4:1.

7. The two-dimensional nanoindentation measurement apparatus of claim 1 wherein the first length dimension is about 20 mm.

8. The two-dimensional nanoindentation measurement apparatus of claim 1 wherein the first width dimension is about 5 mm.

9. The two-dimensional nanoindentation measurement apparatus of claim 1 wherein the second length dimension is about 20 mm.

10. The two-dimensional nanoindentation measurement apparatus of claim 1 wherein the second width dimension is about 5 mm.

11. The two-dimensional nanoindentation measurement apparatus of claim 1 wherein the each of the first and second elongate members has a thickness of about 0.2 mm.

12. The two-dimensional nanoindentation measurement apparatus of claim 1 wherein the first elongate member has a first thickness dimension and the second elongate member has a second thickness dimension, and a ratio of the first length dimension to the first thickness dimension is at least about 100:1, and wherein a ratio of the second length dimension to the second thickness dimension is at least about 100:1.

13. The two-dimensional nanoindentation measurement apparatus of claim 1 wherein the first and second elongate members are formed from one or more of silica, Silicon, and Invar.

14. A method for determining a contact area of an indenter tip in a surface of a material sample using a two-dimensional nanoindentation measurement apparatus, the method comprising:
   (a) moving the indenter tip toward the surface of the material sample in a first direction that is normal to the surface of the material sample to cause the indenter tip to contact the surface of the material sample over the contact area, wherein movement of the indenter tip is achieved by transferring a normal force from a first actuator through a first elongate member, wherein the first elongate member has a first end connected to the first actuator and a second end connected to the indenter tip, and wherein the first elongate member has a first length dimension disposed parallel to the first direction and a first width dimension disposed parallel to a third direction which is orthogonal to the first direction;

(b) while the indenter tip is in contact with the surface of the material sample, oscillating the indenter tip in the second direction that is parallel with the surface of the material sample and perpendicular to the first direction, wherein oscillation of the indenter tip is achieved by transferring a lateral oscillating force from a second actuator through a second elongate member, wherein the second elongate member has a first end connected to the second actuator and a second end connected to the indenter tip, and wherein the second elongate member has a second length dimension disposed parallel to the second direction and a second width dimension disposed parallel to the third direction;

(c) measuring a lateral stiffness of the material sample while performing step (b); and (d) calculating the contact area of the indenter tip with the surface of the material sample based on $$S_L = 8G_{eff}a = \frac{8}{\sqrt{\pi}}G_{eff}\sqrt{A}$$

where $S_L$ is the lateral stiffness of the material sample measured in step (c), $G_{eff}$ is a known shear modulus of the material sample, and A is the contact area of the indenter tip.

15. The method of claim 14 wherein the first elongate member is rigid in the first and third directions, and compliant in the second direction, and wherein the second elongate member is rigid in the second and third directions, and compliant in the first direction.

16. The method of claim 14 wherein a ratio of the first length dimension to the first width dimension is about 4:1, and wherein a ratio of the second length dimension to the second width dimension is about 4:1.

17. A method for measuring properties of a thin film material sample using a two-dimensional nanoindentation measurement apparatus, the method comprising:

(a) moving an indenter tip of the two-dimensional nanoindentation measurement apparatus toward a surface of the thin film material sample in a first direction that is normal to the surface of the thin film material sample to cause the indenter tip to contact the surface of the thin film material sample, wherein movement of the indenter tip is achieved by transferring a normal force from a first actuator through a first elongate member, wherein the first elongate member has a first end connected to the first actuator and a second end connected to the indenter tip, wherein the first elongate member has a first length dimension disposed parallel to the first direction and a first width dimension disposed parallel to a third direction which is orthogonal to the first direction, and wherein the first elongate member is more rigid in the first and third directions than it is in a second direction that is orthogonal to the first and third directions;

(b) while the indenter tip is in contact with the surface of the thin film material sample, moving the indenter tip in the second direction, wherein movement of the indenter tip is achieved by transferring a lateral force from a second actuator through a second elongate member, wherein the second elongate member has a first end connected to the second actuator and a second end connected to the indenter tip, and wherein the second elongate member has a second length dimension disposed parallel to the second direction and a second width dimension disposed parallel to the third direction; and (c) measuring one or more properties of the thin film material sample while performing step (b).

18. The method of claim 17 wherein step (c) comprises measuring a strength of the thin film material sample on a substrate.

19. The method of claim 17 wherein the second elongate member is rigid in the second and third directions, and compliant in the first direction.

20. The method of claim 17 wherein a ratio of the first length dimension to the first width dimension is about 4:1, and wherein a ratio of the second length dimension to the second width dimension is about 4:1.

21. A two-dimensional nanoindentation measurement apparatus for making nanoindentation measurements on a surface of a material sample, the apparatus comprising:

a rigid frame;

a first actuator attached to the rigid frame, the first actuator operable to impart a first force in a first direction that is normal to the surface of the material sample;

a first elongate member having a first length dimension disposed parallel to the first direction, a first width dimension disposed parallel to a third direction which is orthogonal to the first direction, and a first thickness dimension disposed parallel to a second direction that is orthogonal to the first direction and the third direction, wherein the first width dimension is greater than the first thickness dimension, the first elongate member including:

a first end attached to the first actuator; and a second end spaced apart from the first end;

an indenter tip connected to the second end of the first elongate member, the indenter tip operable to engage the surface of the material sample;

a second actuator attached to the rigid frame, the second actuator operable to impart a second force in the second direction; and a second elongate member having a second length dimension disposed parallel to the second direction, a second width dimension disposed parallel to the third direction, and a second thickness dimension disposed parallel to a first direction, wherein the second width dimension is greater than the second thickness dimension, the second elongate member including:

a first end attached to the second actuator; and a second end spaced apart from the first end and connected to the second end of the first elongate member, wherein the first force is imparted to the indenter tip in the first direction through the first elongate member, and wherein the second force is imparted to the indenter tip in the second direction through the second elongate member.

* * * * *